United States Patent [11] 3,585,298

[72] Inventor Richard A. Liberman
Stratford, Conn.
[21] Appl. No. 889,113
[22] Filed Dec. 30, 1969
[45] Patented June 15, 1971
[73] Assignee International Business Machines Corporation
Armonk, N.Y.

[54] TIMING RECOVERY CIRCUIT WITH TWO SPEED PHASE CORRECTION

4 Claims, 5 Drawing Figs.

[52] U.S. Cl. .......... 178/69.5R, 328/63, 328/72, 328/155
[51] Int. Cl. .......... H04l 7/00
[50] Field of Search .......... 178/69.5 R; 325/325; 179/15 BS; 328/72, 155; 307/269

[56] References Cited

UNITED STATES PATENTS

| | | | |
|---|---|---|---|
| 3,238,462 | 3/1966 | Ballard et al. | 328/72 X |
| 3,440,547 | 4/1969 | Houcke | 178/69.5 X |
| 3,447,085 | 5/1969 | Haas et al. | 178/69.5 X |

*Primary Examiner*—Robert L. Richardson
*Attorneys*—Hanifin and Jancin and George E. Clark ABSTRACT: A timing recovery circuit at a receiver provides fine and coarse phase correction in the receiver's local oscillator. The coarse correction adds pulses to the local oscillator's output after it has been divided in frequency whenever the reduced frequency pulses appear outside of a timing window created from a pilot signal sent with the information signal. The fine phase correction adds or deletes pulses in the output of the local oscillator whenever the timing pulses, derived from the output of the coarse phase corrector, do not coincide with data threshold crossings of the information signal. The receiver's timing pulses train is the reduced frequency pulse train resulting from dividing the frequency output of the course phase corrector. The invention herein described was made in the course of Air Force Contract F30602-67C-0168.

INVENTOR
RICHARD A. LIBERMAN
BY George E. Clark
AGENT

TIMING RECOVERY CIRCUIT WITH TWO SPEED PHASE CORRECTION

BACKGROUND OF THE INVENTION

1. Field of the Invention

The invention relates to modulated carrier wave communications systems and in particular to those with control means including a local oscillator synchronization means.

2. Summary of the Prior Art

Most prior art timing recovery circuits utilize one of two schemes. In the first scheme a pilot tone or tones is transmitted along with the information signal. These pilot tones are separated from the information signal at the receiver and are used to synchronize the local receiver oscillator. However, if only one pilot tone is sent, it is more likely than not the phase of this pilot tone will change with respect to the phase of the information signal. If this happens, the receiver oscillator cannot become accurately synchronized to the oscillator at the transmitter. The result is that the receiver's sampling pulses are out of phase with the data contained in the information signal, and poor demodulation and data decoding occurs.

To overcome the differential phase shift between the information signal and the pilot tone, many prior art devices send two pilot tones, one at a frequency above the information signal and one at a frequency below the information signal. The receiver mixes these two or more pilot tones to reconstruct the center frequency of the information signal. The prior art devices attempt to carefully select the frequencies of the pilot tones and the proportions in which they are mixed so as to reconstruct a signal with a phase shift identical to that occurring in the information signal. Usually these attempts are less than fully successful because channel characteristics are unpredictable and varying. Further, bandwidth that could well be used for transmitting information is utilized for sending these pilot tones. Lastly, the equipment necessary to modulate, demodulate, extract, and mix the pilot tones is complicated, expensive, and usually difficult to implement.

In order to overcome the disadvantages of the above scheme, the prior art has utilized another method for synchronizing the local oscillator at the receiver. This scheme synchronizes the local receiver on the received data. That is, the timing recovery at the receiver detects data transitions and/or threshold levels in the received information signal. Since it is known at what relative time these occur, it is possible to synchronize the oscillator at the local receiver. However, this scheme suffers from an extremely long synchronization acquisition. That is, before synchronization has been definitely acquired, a long stream of data must be received. More significantly, it also suffers from jitter which may result from threshold crossings at spurious times. An ambiguity can also occur if the received information signal is not a random waveform and additional unwanted threshold crossings are generated in addition to the required threshold crossings. Before the recent development of high speed data processing equipment, this long acquisition period could be tolerated. The transmission time for the synchronization data was not long relative to the time necessary to send the information. However, with the development of high speed data processing and data transmission systems, a long period of acquisition synchronization prevents the transmission of an appreciable quantity of information.

This is especially true in what has become known as point-to-point operation as contrasted with multidrop operation. In the latter operation many computers are located along a single communication line. In this mode a "master" processing unit (or a remote unit through some other well-known method) must indicate which of the plurality of remote terminals is to transmit. In all likelihood the unit to transmit next was not the unit that has just transmitted. Therefore, the master unit must acquire synchronization from this unit. Therefore, a synchronization period must be utilized where a burst of data (or a pilot tone) is sent from the remote unit to the master unit in order that the master unit may acquire synchronization with the remote unit's transmitter.

Some prior art devices using the data synchronization scheme, operating in a point-to-point mode, require means to detect if synchronization still exists. If it does not, a synchronization sequence is initiated. That is, a burst of synchronization data is transmitted. The respective units synchronize their oscillators in accordance with transitions or thresholds in the synchronization data. After a given time it is assumed that synchronization has been regained, and the system starts sending information data. This approach is required to overcome ambiguities in timing information. This approach is disadvantageous because a duplex return channel is required to notify the transmitting unit that a loss of synchronization exists. It also means that the data flow must be interrupted while resynchronization takes place.

Moreover, prior art devices using data synchronization often suffer from jitter. Jitter refers to the rapid phase fluctuations in the receiver's timing pulse. These fluctuations often occur when the timing recovery mistakenly shifts the phase of the timing pulses due to erratic information. Since the form of the information signal is unpredictable, various techniques have been developed to prevent the timing and recovery circuits from acting on incorrect information. In the past these schemes have been expensive and complicated. For example, Becker, U.S. Pat. No. 3,401,342, describes such a scheme which necessitates an equalizer.

Also, some prior art devices have combined the above two schemes. However, their prior art devices use the schemes in the alternative, switching from one to the other.

Therefore, it is an object of this invention to devise an improved timing recovery circuit.

It is another object of the invention to provide such an improved timing recovery circuit which has a relatively short synchronization acquisition period and very low jitter.

It is another object of this invention to provide such a timing recovery circuit which is inexpensive and easily implemented.

It is another object of this invention to provide such a timing and recovery circuit which simultaneously uses the short acquisition period of pilot tone transmission and accurate synchronization from monitoring the data.

SUMMARY OF THE INVENTION

The timing recovery circuit includes both coarse and fine phase adjustments. The coarse phase adjustment permits fast synchronization acquisition. The fine phase correction permits accurate sampling of the information signal.

To provide for the coarse phase correction a pilot tone is transmitted with the information signal. A timing window is constructed at the receiver from the pilot tone during which period the center of the "eye" occurs. The coarse phase corrector examines the timing pulse at the receiver. If the timing pulse does not occur within the timing window constructed from the pilot, the coarse phase corrector inserts a pulse in the pulse train output of the receiver's high frequency oscillator after that high frequency has been partially reduced. By inserting the pulse after the frequency is partially reduced, rather than before any reduction in frequency, there is a larger effect on the increment of phase correction of the fully reduced pulse train. This corrected pulse train forms the output of the coarse phase corrector. This output is further reduced in frequency by a frequency divider and forms the timing pulses at the receiver, i.e., it has the same frequency as that of the received data rate.

The fine phase correction is performed by a threshold crossing detector and a fine phase corrector operating on the unreduced high frequency oscillator output. The threshold crossing detector compares the time at which the information signal crosses data levels with the receiver's timing pulse. If the timing pulse occurs before the data threshold crossing, a delete signal is sent from the threshold crossing detector to the fine phase corrector. If the timing pulse occurs after a data level crossing, an add signal is sent from the threshold crossing detector to the fine phase corrector.

Upon the add and delete commands from the threshold crossing detector, the fine phase corrector adds or deletes pulses in the high frequency output of the receiver's crystal oscillator. Thus, the phase of the pulse train leaving the divider circuit is different than the phase at the output of the high frequency crystal oscillator. The pulse train at the output of the fine phase corrector is reduced in frequency by a divider circuit and forms the reduced frequency input to the coarse phase corrector.

The preferred embodiment of the invention also contains means to prevent the fine phase corrector from adding or deleting pulses caused by threshold crossings at spurious times (i.e., times other than around the center of the eye) to reduce jitter. This is provided by a timing window generator which generates a timing window based upon the timing pulse of the receiver (the output of the last divider). This timing window forms an input to the fine phase corrector and gates its operation.

SHORT DESCRIPTION OF THE DRAWINGS

The foregoing and other objects, features and advantages of the invention will be apparent from the following more particular description of a preferred embodiment of the invention, as illustrated in the accompanying drawings.

DESCRIPTION OF THE INVENTION

Figure 4:
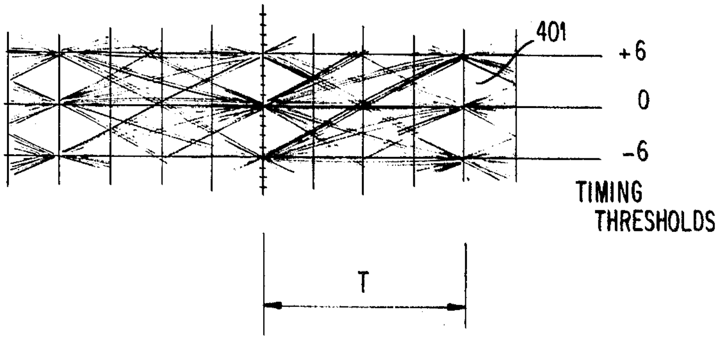
FIG. 4 is a diagram of an "eye" pattern.

FIG. 4 is a diagrammatical reproduction of an oscilloscope trance of an information signal upon which the present invention can best be applied. This pattern is known to those skilled in the art as an "eye" pattern. For example, see the above Becker patent, FIG. 8, A plurality of eyes 401 are shown situated between the various data levels, +6, 0, and −6. These eyes are formed when the information signal travels from one data level to another data level. This can be best seen from FIG. 5. Here the information signal is at point 501. During the next information time T seconds later the information signal can either be at point 503, 505, or 507.

As those skilled in the art will recognize, the eye pattern trace shown in FIG. 4 is for three data levels. However, the invention is equally applicable to information sent with more or less data levels.

Figure 5:
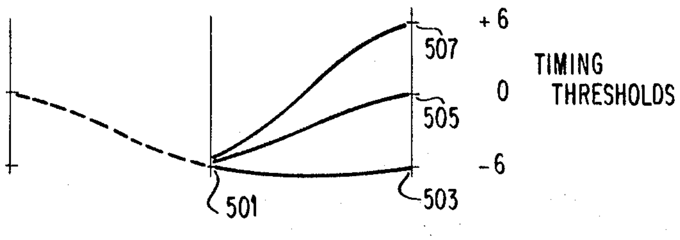
FIG. 5 is a diagram of an information signal traversing data thresholds.

The data levels are indicated in FIGS. 4 and 5 to be at +6, 0, and −6. However, in the preferred embodiment, data level threshold detectors are used only at the +6 and 0 levels. Before applying the information signal to those data level threshold detectors, the information signal is full wave rectified (not shown). Thus, the same information is recovered by the two threshold detectors if there was no full wave rectification and three threshold detectors.

The information signal is sampled by the receiver on command of the timing pulse. For clarity of description the detailed processes of sampling are not shown. It may be accomplished by any well-known technique. See the above mentioned Becker patent as one example.

By reference to FIG. 4, it can be appreciated that if the receiver's timing pulse, indicating a sampling time, does not occur at the exact center of the eye, i.e., point 501, the information signal will be between data levels. If the timing pulse is sufficiently out of phase, the information signal could be decoded as corresponding to the wrong data level. That is, the information signal will be caught between two decoding threshold detectors corresponding to an incorrect data level.

Figure 1:
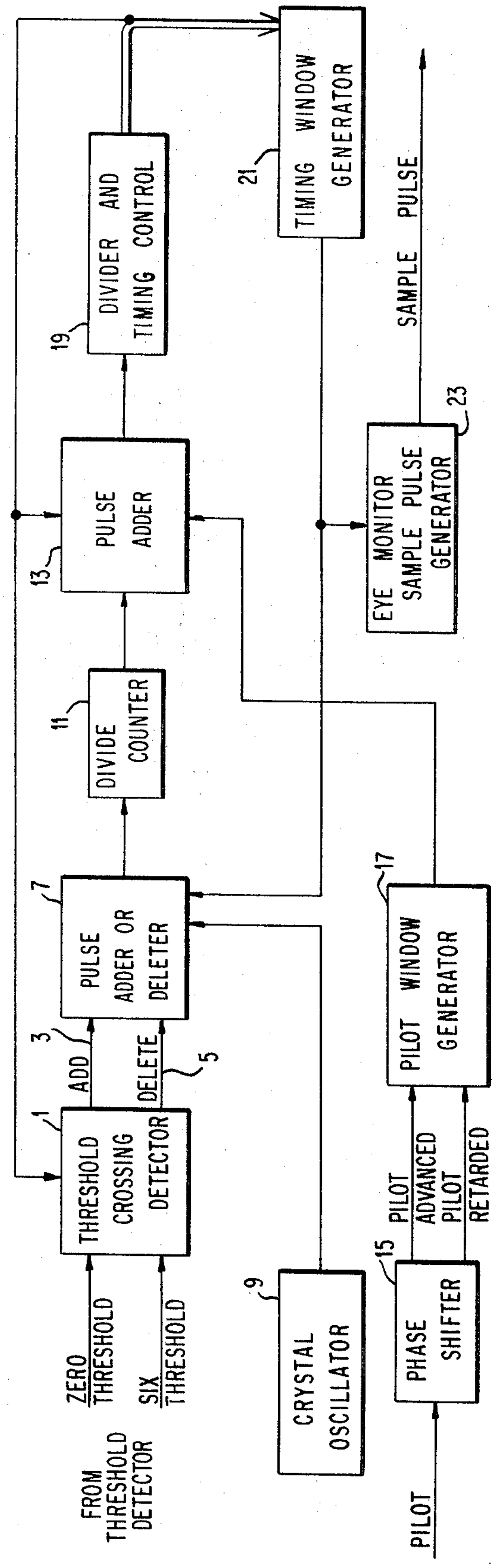
FIG. 1 is a diagram of the preferred embodiment of the invention.

Referring to FIG. 1, there is illustrated the preferred embodiment of the present invention, the timing recovery section of a communication receiver being unnecessary to show the remainder of the receiver as it is well known in the art. To provide for the fine phase correction, the data level thresholds detected, at the zero level and at the six level (after the information signal has been full wave rectified - not shown), are supplied to threshold crossing detector 1. Threshold crossing detector 1 detects whenever the zero threshold or the six data level threshold changes state. The threshold crossing detector is not shown in detail for ease of illustration. It can be of any form as is well known in the art, preferably a comparator comparing the level of the received information signal with a reference voltage.

Level threshold changes for timing should occur at the "-center of the eye." Threshold crossing detector 1 compares the time of these level threshold crossings with the time that a transition occurs in the receiver's timing pulse train. If a level threshold crossing occurs before the timing pulse, it is an indication that the timing pulse is late. If the threshold crossing occurs before the timing pulse, it is an indication that the timing pulse is late. If the threshold crossing occurs after the timing pulse, it is an indication that the timing pulse is occurring early.

If the timing pulse is early, the threshold crossing detector raises its delete output 5; if the timing pulse is late, threshold crossing detector 1 raises its add output 3.

In order to correct the phase of the timing pulses, add output 3 and delete output 5 are connected to a pulse adder or deleter 7. Pulse adder or deleter 7 can be any of the configurations well known in the art as fully described in Brook et al., U.S. Pat. No. 3,401,342, assigned to the assignee of the present invention. Another example, it could consist of a one shot pulse generator properly timed to insert a pulse between oscillator pulses upon an add output 3 and a gate inhibiting the passage of a pulse on a delete output 5. Also forming an input to pulse adder or deleter 7 is the output of crystal oscillator 9. Crystal oscillator 9 produces a high frequency oscillation (1.3824 $MH_z$ in the preferred embodiment). It is in the pulse train of high frequency pulses produced by crystal oscillator 9 that pulse adder or deleter 7 adds or deletes pulses in accordance with instructions on add output 3 and delete output 5 of threshold crossing detector 1.

Pulse adder 13 and the associated hardware to be described form the coarse correction circuitry. This circuitry makes large corrections in the phase of the receiver's timing pulse train. In the preferred embodiment coarse pulse adder 13 only adds pulses (advance the timing pulse train). It may be identical to the add means in pulse adder and deleter 7. However, one skilled in the art could easily modify the device so as to delete pulses as in pulse adder or deleter 7, without departing from the spirit of the invention.

To provide a timing reference for pulse adder 13 the received pilot signal forms an input to phase shifter 15. The output of phase shifter 15 presents two signals, one with the pilot advanced from its normal position and one with the pilot retarded from its normal position in preferred embodiments the pilot advance and the pilot retardation is 25°. These two signals form the input to pilot window generator 17. Pilot window generator 17 produces an output which combines its two inputs such that the output is at an up level for 25° before and 25° after the center of an eye, i.e., the position at which a timing pulse should occur. This output of pilot window generator 17 forms an input to pulse adder 13. The pilot window can be made wide to make the system insensitive to variations in the phase of the received pilot signal.

Also forming an input to pulse adder 13 is the timing pulse train. Pulse adder 13 adds a pulse whenever the rise of the timing pulse does not occur within the pilot window produced by pilot window generator 17. This is best seen from the timing diagrams shown in FIG. 3.

Figure 3:
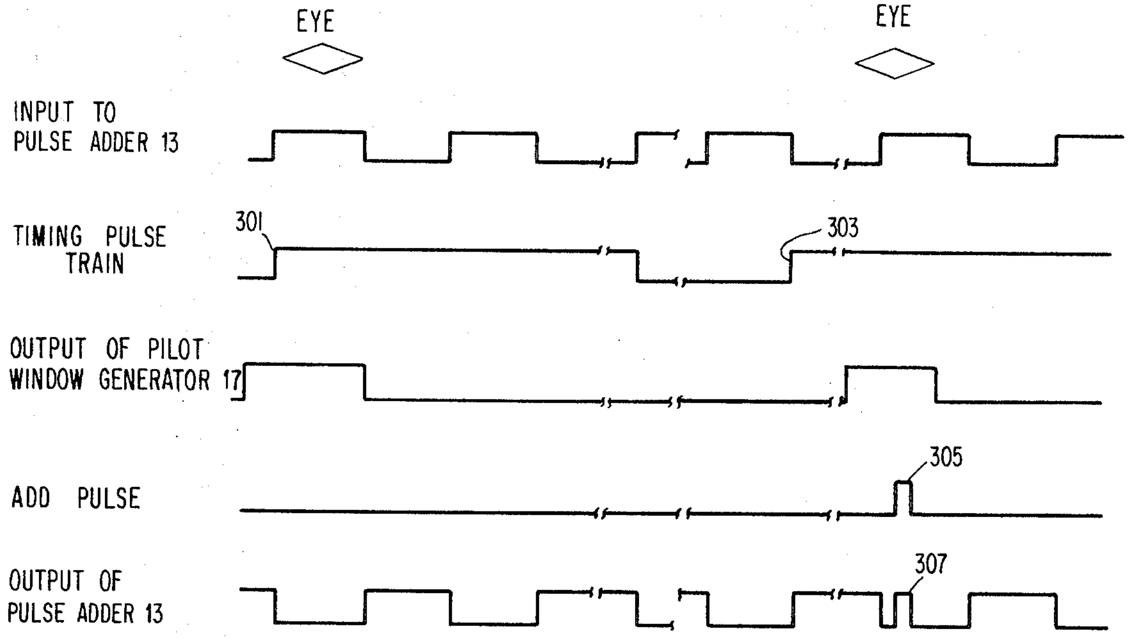
FIG. 3 is another timing diagram of the operation of the preferred embodiment of the invention.

The relatively low frequency input to pulse adder 13 from divide counter 11 is shown in the first line of FIG. 3. Shown in the second line of FIG. 3 is the timing pulse train. Shown in the third line of FIG. 3 is the output of pilot window generator 17.

When the timing pulse train is compared to the output of pilot window generator 17, there is one pulse rise 301 within the window, and at a later time there is another pulse 303 rise outside the window. In the fourth line of FIG. 3 there is shown an internal signal in pulse adder 13. This signal indicates to the hardware in pulse adder 13 to add a pulse to the input from divide counter 11 (the first line of FIG. 3). There is a pulse on the add pulse line of FIG. 3 only when there is a rise in the timing pulse outside of the pilot window produced by pilot window generator 17. This pulse 305, corresponding to rise 303, is added to the pulses at the input at the input to pulse adder 13 at 307. The output of pulse adder 13 assumes the configuration shown in the last line of FIG. 3.

The output of pulse adder 13 forms the input of divider timing controls 19. Divider and timing controls 19 divide the output of pulse adder 13 producing a low frequency pulse train which coincides with the center of the eye. In the preferred embodiment divider and timing control 19 divides the output pulse adder 13 by 24 producing a 4800 Hz timing pulse train. The output of divider and timing control 19 forms the input as mentioned above to threshold crossing detector 1 and pulse adder 13.

In order to improve jitter, pulse adder or deleter 7 is prevented from adding or deleting pulses at times other than around the center of an eye. Timing window generator 21 takes the timing pulse train produced by divider and timing control 19 and produces an output which has an up level shortly before, during, and shortly after the rise of a timing pulse. IN the preferred embodiment timing window generator 21 is a series of gates and flip-flops which form a window by taking the outputs of certain of the divider flip-flops in divider and timing control 19 and combine them into a form of a timing window. The above-mentioned Becker patent shows another method in FIG. 13, aperture generator 179. The timing window allows pulse adder or deleter 7 to add or delete pulses in accordance with the above description. At times when the timing window is not up pulse adder and deleter 7 is prevented from adding or deleting pulses from the pulse train produced by crystal oscillator 9. Pulse adder or deleter 7 does not add or delete pulses at times when thresholds are crossed other than at times centering around the center of the "eye." Thus, incorrect phase correction does not occur due to threshold crossings of the demodulated waveform when traveling from one eye to the next eye or, from threshold crossings due to noise at times other than at the center of the eye. This eliminates jitter in the timing waveform.

The output of timing window generator 21 is also connected to eye monitor sample pulse generator 23. Eye monitor sample pulse generator 23 produces a sample pulse which is used to gate the decoding threshold detectors mentioned above. That is the output of eye monitor sample pulse generator 23 is used as the actual timing sample pulse for the remainder of the receiver.

OPERATION OF THE INVENTION

The invention as shown in FIG. 1 operates simultaneously and continuously making coarse phase adjustments and fine phase adjustments. As described above, the fine phase adjustments are made by pulse adder or deleter 7 in combination with threshold crossing detector 1 when the timing pulses do not coincide with threshold crossings. For example, referring to FIG. 2, threshold crossing detector 1 indicates a transition at pulse 201. Pulse 201 occurs after the receiver timing pulse has risen, i.e., the timing pulse is in an up state after having risen from a low state. Therefore, the receiver's timing pulse is slightly late. The threshold crossing detector 1 produces a pulse 203 on add output 3. In response to pulse 203, pulse adder or deleter 7 inserts into the pulse train produced by oscillator 9 a pulse 205 as shown in the sixth line of FIG. 2.

Figure 2:
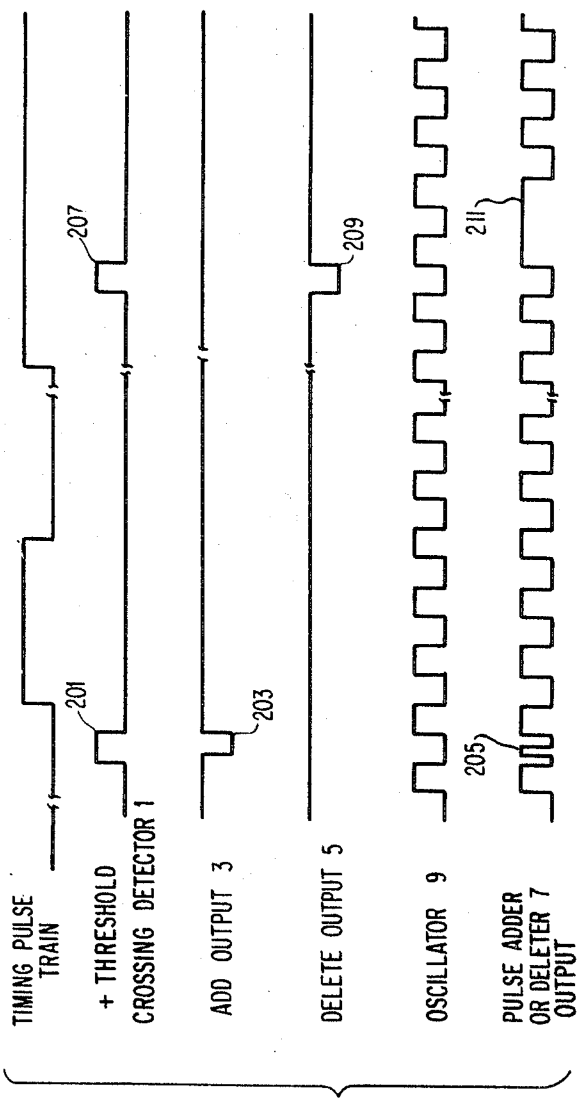
FIG. 2 is a timing diagram of the operation of the preferred embodiment of the invention.

The sixth line of FIG. 2 forms the input to divide counter 11. Divide counter 11 produces at its output a pulse train in phase with the pulse train pilot its input but reduced in frequency. The reduced frequency pulse train output of divide counter 11 forms the timing of pulse adder 13. This trend of pulses is shown in the first line of FIG. 3.

Pulse adder 13 forms the coarse phase correction means. That is, if the timing pulse train at the output of divider and timing control 19 is not within the pilot window which is in the area of the information eye, pulse adder 13 corrects the phase of the timing pulse train bringing it into the region of the eye.

Referring to FIG. 3, the operation of pulse adder 13 is shown. The area of the center of the eye is indicated by pilot window generator 17. Pilot window generator 17 produces a widow centered around the transmitted pilot. The transmitted pilot indicates approximately the center of the eye. The first timing rise 301 occurs when the output of the pilot window generator 17 is high. This indicates that pulse 301 occurred approximately near the center of the eye.

At a later time a pulse 303 occurs. At this time, the output of pilot generator window 17 is down, indicating that pulse 303 did not occur near the center of the eye. In response to this occurrence of a pulse in the timing pulse train at outside the pilot window, pulse adder 13 adds a pulse 305 to the output of pulse adder 13 as shown by pulse 307.

It should be noted that both pulse, adder or deleter 7 (the fine phase corrector) and pulse adder 13 (the coarse phase corrector) operate independently and simultaneously. The timing recovery circuit forming the present invention does not require any switching between the modes of fine phase correction and coarse phase correction. The coarse phase correction automatically keeps the timing pulse in the area of the "eye" in order that the fine phase corrector can make the fine adjustment. In addition, as mentioned above, the coarse phase correction provides a fast synchronization acquisition; and the fine phase correction provides extremely accurate timing pulses.

While the invention has been particularly shown and described with reference to a preferred embodiment thereof, it will be understood by those skilled in the art that various changes in form and details may be made therein without departing from the spirit and scope of the invention.

What I claim is:

1. In a receiver, a timing recovery circuit wherein the received signal comprises an information signal and a pilot signal including:

oscillator means supplying a high frequency pulse;

threshold means determining when the information signal crosses data level thresholds;

fine phase correction means connected to said threshold means and to said source of high frequency pulses, inserting and deleting pulses in said stream of high frequency pulses when said threshold means indicate a data level threshold crossing;

divider means connected to the output of said fine phase correction means producing output pulses of lower frequency in phase with the output of said fine phase correction means; and coarse phase correction means connected to said divider means inserting or deleting pulses in said train of low frequency pulses when said pulses are sufficiently out of phase with said pilot tone.

2. A device as in claim 1 including:

divider means connected to the output of said coarse phase correction means producing a low frequency pulse.

3. A device as in claim 1, said coarse phase correction means including:

means receiving said pilot tone and producing therefrom a pilot window centered about said pilot tone; and said coarse phase correction means adding pulses when said low frequency pulse train occurs outside of said timing window.

4. A device as in claim 3 wherein:

said fine phase correction includes means inserting or deleting pulses only during the occurrence of said timing window.